United States Patent
Wagner et al.

(10) Patent No.: US 9,058,683 B2
(45) Date of Patent: Jun. 16, 2015

(54) AUTOMATIC IMAGE RECTIFICATION FOR VISUAL SEARCH

(71) Applicant: QUALCOMM Incorporated, San Diego, CA (US)

(72) Inventors: Daniel Wagner, Vienna (AT); Qi Pan, Vienna (AT)

(73) Assignee: Qualcomm Incorporated, San Diego, CA (US)

( * ) Notice: Subject to any disclaimer, the term of this patent is extended or adjusted under 35 U.S.C. 154(b) by 108 days.

(21) Appl. No.: 13/772,640

(22) Filed: Feb. 21, 2013

(65) Prior Publication Data

US 2014/0233845 A1  Aug. 21, 2014

(51) Int. Cl.
*G06K 9/00* (2006.01)
*G06T 17/00* (2006.01)
*G06F 17/30* (2006.01)

(52) U.S. Cl.
CPC .......... *G06T 17/00* (2013.01); *G06F 17/30286* (2013.01)

(58) Field of Classification Search
USPC .................. 345/653, 664, 679, 953; 348/580; 382/154, 275; 715/757, 852
See application file for complete search history.

(56) References Cited

U.S. PATENT DOCUMENTS

| | | | | |
|---|---|---|---|---|
| 5,633,995 | A * | 5/1997 | McClain | 345/419 |
| 6,173,070 | B1 * | 1/2001 | Michael et al. | 382/145 |
| 6,788,809 | B1 * | 9/2004 | Grzeszczuk et al. | 382/154 |
| 7,711,180 | B2 | 5/2010 | Ito et al. | |
| 8,315,442 | B2 | 11/2012 | Gokturk et al. | |
| 2003/0030731 | A1 * | 2/2003 | Colby | 348/231.3 |
| 2005/0047636 | A1 * | 3/2005 | Gines et al. | 382/131 |
| 2005/0180632 | A1 * | 8/2005 | Aradhye et al. | 382/182 |
| 2006/0103731 | A1 * | 5/2006 | Pilu et al. | 348/207.99 |
| 2006/0210145 | A1 * | 9/2006 | Lee et al. | 382/154 |
| 2007/0064099 | A1 * | 3/2007 | Balter et al. | 348/51 |
| 2008/0215979 | A1 * | 9/2008 | Clifton et al. | 715/716 |
| 2009/0141940 | A1 * | 6/2009 | Zhao et al. | 382/103 |
| 2009/0297029 | A1 * | 12/2009 | Cazier | 382/190 |
| 2010/0322472 | A1 * | 12/2010 | Hamalainen | 382/103 |
| 2011/0194772 | A1 * | 8/2011 | SanJuan et al. | 382/190 |
| 2011/0292248 | A1 * | 12/2011 | de Leon et al. | 348/231.99 |
| 2011/0293162 | A1 * | 12/2011 | Pajeau | 382/132 |
| 2012/0218444 | A1 | 8/2012 | Stach | |
| 2012/0219188 | A1 | 8/2012 | Kurz et al. | |
| 2012/0224068 | A1 | 9/2012 | Sweet, III | |

(Continued)

FOREIGN PATENT DOCUMENTS

JP          09044702 A  *  2/1997  .............. G06F 17/50

OTHER PUBLICATIONS

International Search Report and Written Opinion—PCT/US2014/014763—ISAEPO—Apr. 3, 2014.

(Continued)

*Primary Examiner* — Gregory F Cunningham
(74) *Attorney, Agent, or Firm* — Kilpatrick Townsend & Stockton LLP (57) ABSTRACT

Disclosed is a computing device that can perform automatic image rectification for a visual search. A method implemented at a computing device includes receiving one or more images from an image capture device, storing the one or more images with the computing device, building a three dimensional (3D) geometric model for one or more potential objects of interest within an environment based on at least one image of the one or more images, and automatically creating at least one rectified image having at least one potential object of interest for a visual search.

50 Claims, 5 Drawing Sheets

(56) References Cited

U.S. PATENT DOCUMENTS

2012/0327194 A1* 12/2012 Shiratori et al. ............... 348/47
2013/0010077 A1* 1/2013 Nguyen et al. ............... 348/46
2013/0135301 A1* 5/2013 Marimon Sanjuan
 et al. ............................ 345/420

OTHER PUBLICATIONS

Nakanishi T., et al., "An implementation Method of Associative Search for Heterogenous Mediadata Utilizing the Mathematical Model of Meaning and its Application to Image Data and Facial Expression", 2003 IEEE Pacific Rim Conference on Communications, Computers and Signal Processing, (PACRIM 2003), Aug. 28-30, 2003, pp. 613-618.

Xia Y., et al., "Remote Sensing Image Data Storage and Search Method Based on Pyramid Model in Cloud", Rough Sets and Knowledge Technology, Springer Berlin Heidelberg, Berlin, Heidelberg, vol. 7414, pp. 267-275, Aug. 17, 2012, XP047012239, ISBN: 978-3-642-31899-3.

* cited by examiner

AUTOMATIC IMAGE RECTIFICATION FOR VISUAL SEARCH

BACKGROUND

The present invention relates generally to a computing device that is capable of automatic image rectification for a visual search.

RELEVANT BACKGROUND

Users are accessing different services such as a visual search service from a wide range of different computing devices (e.g., both mobile devices and non-mobile devices). For example, these different computing devices include home computers, work computers, mobile phones, mobile device, tablets, etc. Visual search has become a popular service. Users upload images to a server, which matches the images against other images stored in its database and eventually returns information about the uploaded images. The algorithms that match the query images against the database images are typically designed such that they can handle a certain amount of warping (i.e., translation, scale, rotation, and perspective effects). Also, these methods can detect objects in pictures that contain additional, irrelevant details (i.e., clutter). However, even though the algorithms are able to cope with these difficulties, the algorithms require more time and processing resources for coping with these difficulties. The irrelevant clutter in the camera image not only makes it harder for the server to find the object of interest, it also increases the size of the image that is sent to the server.

SUMMARY

Aspects of the invention may relate to a computing device that can perform automatic image rectification for a visual search. The computing device may include a storage medium that stores one or more images and a processing circuit that is configured to execute instructions to build a three dimensional (3D) geometric model for one or more potential objects of interest within an environment based on at least one image of the one or more images. The processing circuit is also configured to execute instructions to automatically create at least one rectified image having at least one potential object of interest for the visual search.

Aspects of the invention may also relate to a method that is implemented at a computing device. The method includes receiving one or more images from an image capture device, storing the one or more images with the computing device, building a three dimensional (3D) geometric model for one or more potential objects of interest within an environment based on at least one image of the one or more images, and automatically creating at least one rectified image having at least one potential object of interest for a visual search.

Aspects of the invention may also relate to a computer program product that is executed at a computing device. The computer program product includes a computer-readable medium that includes code for storing one or more images with the computing device, building a three dimensional (3D) geometric model with the computing device for one or more potential objects of interest within an environment based on at least one image of the one or more images, and automatically creating at least one rectified image having at least one potential object of interest for a visual search.

Aspects of the invention may also relate to an apparatus that includes a means for storing one or more received images, a means for building a three dimensional (3D) geometric model for one or more potential objects of interest within an environment based on at least one image of the one or more stored images, and a means for automatically creating at least one rectified image having at least one potential object of interest for a visual search.

Aspects of the invention may also relate to a server for performing a visual search. The server may include a storage medium that stores images and a processing circuit that is configured to execute instructions to receive at least one rectified image having at least one potential object of interest from a computing device for a visual search and to extract descriptors representing features of the at least one rectified image. The extracted descriptors of the at least one rectified image may be designed to be invariant to rotation, scale, and lighting without needing to be invariant to perspective or affine distortion. The processing circuit can be further configured to execute instructions to match the extracted descriptors of the at least one rectified image with descriptors of the images stored in the database.

Aspects of the invention may also relate to a method that is implemented at a server. The method includes storing a plurality of images with the server, receiving at least one rectified image having at least one potential object of interest from a computing device for a visual search, and extracting descriptors representing features of the at least one rectified image. The extracted descriptors of the at least one rectified image may be designed to be invariant to rotation, scale, and lighting without needing to be invariant to perspective or affine distortion.

Aspects of the invention may also relate to a computer program product that is executed at a server. The computer program product includes a computer-readable medium that includes code for storing a plurality of images, receiving at least one rectified image having at least one potential object of interest from a computing device for a visual search, and extracting descriptors representing features of the at least one rectified image. The extracted descriptors of the at least one rectified image may be designed to be invariant to rotation, scale, and lighting without needing to be invariant to perspective or affine distortion.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
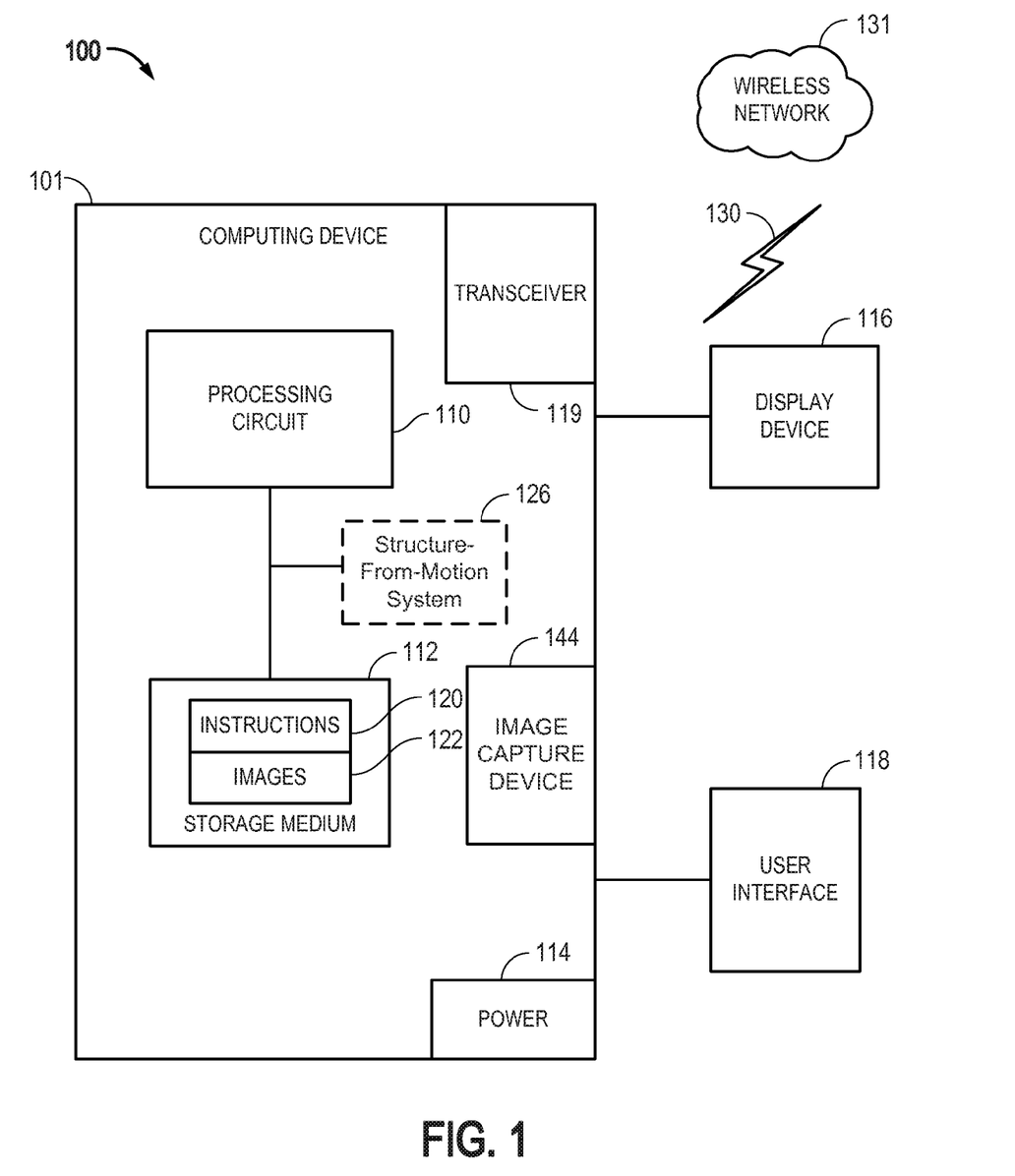
FIG. 1 is a block diagram of a system having a computing device for automatically creating at least one rectified image.

FIG. 1 is block diagram of a system having a computing device for automatically creating at least one rectified image. In particular, system 100 illustrates a computing device 101 that can automatically create at least one rectified image so that a visual search service has a higher chance of correctly detecting one or more objects of interest for a user. Computing device 101 may include a processing circuit 110, a storage medium 112 to store instructions 120 and images 122, a power device 114, a display device 116, a user interface 118, a transceiver 119, and an image capture device 144 (e.g., camera, video camera, etc.) for capturing images (e.g., digital still image, sequence of images that form a video). In another embodiment, the image capture device is located externally from the computing device. The image capture device may be associated with the computing device and be communicatively coupled to the computing device. For example, a computing device (e.g., mobile device) might be in a user's pocket and wirelessly connected to the image capture device (e.g., camera) that is mounted on a pair of the user's glasses. An exemplary storage medium (e.g., a computer-readable medium) is coupled to the processing circuit such that the processor can read information from, and write information to, the storage medium. In the alternative, the storage medium may be integral to the processing circuit. It should be appreciated that the display device 116 may be a typical display device on a computing device 101 such as a mobile device, cell phone, personal digital assistant, mobile computer, tablet, etc. User interface 118 may be a keyboard, touch-screen, or another type of user interface input device. Further, power device 114 may be a battery device to power computing device 101. Transceiver 119 may be used to transmit and receive calls and data through wireless link 130 to/from a wireless network 131.

In particular, computing device 101 may include a processing circuit 110 that is configured to execute instructions 120 to build a three dimensional (3D) geometric model for one or more potential objects of interest within an environment based on at least one image of one or more captured images and to automatically create at least one rectified image having at least one potential object of interest for a visual search. The processing circuit 110 can be further configured to execute instructions to automatically upload the at least one rectified image to a server for the visual search. For example, a user of the computing device may not provide a user input for uploading the rectified image to the server. Alternatively, the user may be aware that the rectified image is being uploaded to the server and the user may manually select an option for uploading the rectified image to the server for the visual search.

In one embodiment, the image capture device captures images during a background operation and at least one rectified image of a potential object of interest located in the captured images is automatically created for the visual search without receiving a user input. The image capture device may capture the images during the background operation without receiving input from the user for capturing the images.

In some aspects, the image capture device captures the images during a time period with the computing device moving for at least a portion of the time period. In other aspects, the image capture device is capable of providing depth information for the at least one potential object of interest and captures the images while the computing device is not required to move because of the depth information. Alternatively, for an image capture device that is located externally from the computing device, the image capture device captures the images during a time period with the image capture device moving for at least a portion of the time period. In other alternative aspects, the image capture device provides depth information for the at least one potential object of interest and captures the images while the image capture device is not required to move because of the depth information.

It should be appreciated that aspects of the invention as will be hereinafter described may be implemented in conjunction with the execution of instructions by processing circuit 110 of computing device 101 and/or other circuitry of the computing device 101 and/or other devices. Particularly, circuitry of the computing device 101, including but not limited to processing circuit 110, may operate under the control of a program, routine, or the execution of instructions to execute methods or processes in accordance with embodiments of the invention. For example, such a program may be implemented in firmware or software (e.g., stored in storage medium 112 and/or other locations) and may be implemented by processors, such as processing circuit 110, and/or other circuitry of computing device 101. Further, it should be appreciated that the terms processing circuit, processor, microprocessor, circuitry, controller, etc., refer to any type of logic or circuitry capable of executing logic, commands, instructions, software, firmware, functionality, etc.

Further, computing device 101 may communicate via one or more wireless communication links 130 through a wireless network 131 that are based on or otherwise support any suitable wireless communication technology. For example, in some aspects computing device 101 may associate with a network including a wireless network 131. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may include a wireless transceiver with associated transmitter and receiver components (e.g., a transmitter and a receiver) that may include various components (e.g., signal generators and signal processors) that facilitate communication over a wireless medium. As is well known, a computing device 101 may therefore wirelessly communicate with other mobile devices, cell phones, other wired and wireless computers, Internet web-sites, etc.

Figure 2:
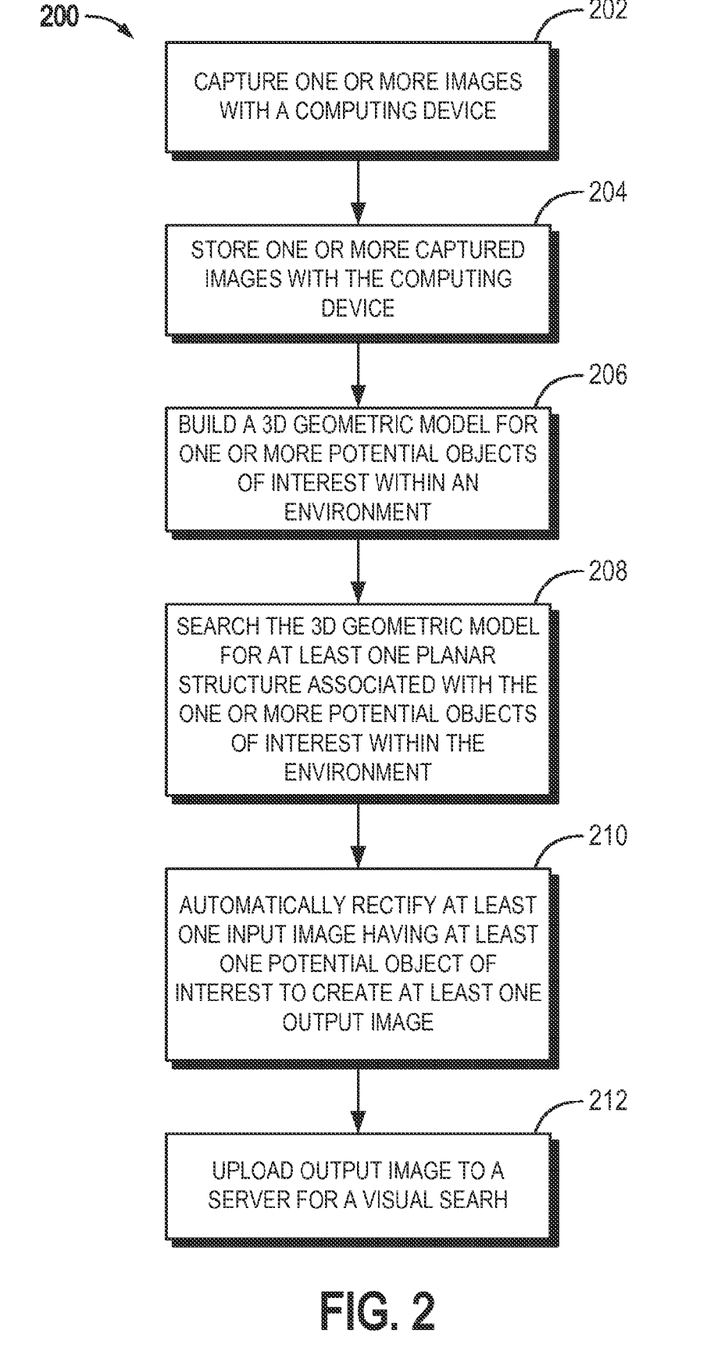
FIG. 2 is a flow diagram to illustrate a process for automatically rectifying images captured by a computing device.

With additional reference to FIG. 2, a flow diagram is shown to illustrate a process 200 for automatically creating rectified images. In one embodiment, this process improves visual search matching results by automatically creating rectified images into frontal views so that the visual search service has a higher chance of correctly detecting the object of interest. Additionally, this process can automatically combine parts of an object from multiple pictures into a single image. The basis for these improvements is a system that gathers 3D geometric knowledge about the scene in addition to merely using photometric measurements for a picture. This system builds a 3D geometric model of the environment (e.g., a dense 3D point cloud map of an environment).

At block 202, an image capture device that is associated with a computing device captures one or more images. The image capture device may be integrated with the computing device or located externally from the computing device. At block 204, the computing device stores the one or more captured images (e.g., stores the images in a storage medium). At block 206, the process builds a 3D geometric model for one or more potential objects of interest within an environment based on at least one of the one or more the captured images.

For a monocular camera, a structure-from-motion system provides such geometric information of the 3D geometric model (e.g., structure-from-motion system 126). In some instances, the computing device captures the images during a time period with the computing device moving for at least a portion of the time period. For example, a user may pan the computing device within the environment to capture images of the environment. Other sensors, which may be found on a depth camera (e.g., RGB-D camera), can be used to directly provide depth without requiring motion. In these instances, the computing device provides depth information for the at least one potential object of interest and captures the images while the computing device is not required to move. A depth camera provides depth information for captured pixels. The depth camera may sense reflected light from the surface of each object. For practical purposes, a real-time system reconstructing the scene's geometry in real-time (e.g., instantaneously, nearly instantaneously) is needed. Recently Simultaneous Localization and Mapping (SLAM) systems have become efficient and robust enough for practical use on computing devices including mobile phones. With a SLAM system, the user points the camera at an object of interest and starts moving. While the user with the camera is moving, the SLAM system tracks details in the camera images and builds a geometric model of the environment. In the case of a device equipped with an RGB-D camera, a single image is enough to build an initial geometric model, which can be extended by motion. The object of interest does not have to be fully visible nor does the user have to be directly in front of it. It is sufficient that most parts of the object are visible at some point in the camera image. The SLAM system also takes pictures (e.g., keyframes), which it needs for its internal purposes, while the SLAM system is building the geometric model of the environment. The keyframes may be taken periodically (e.g., every 2-5 seconds) to determine a camera position in the environment.

In one embodiment, the computing device captures the one or more images and automatically creates at least one rectified image of a potential object of interest that is located in the one or more captured images for the visual search without receiving a user input. For example, the user aims the camera towards an object of interest and the camera captures images of the object of interest as well as other potential objects of interest. The computing device then automatically rectifies the object of interest as well as other potential objects of interest and the rectified images can be used for a visual search. The user interface of the computing device may not indicate that automatically rectified images will be used for a visual search.

In some instances, the computing device captures the images during a background operation without receiving a user input for capturing the images. During the background operation, the user interface of the computing device may not indicate that images are being captured or that rectified images will be used for a visual search. At block 208, once the reconstruction of the environment is at least partially finished based on the 3D geometric model, which may occur in a short time period (e.g., up to a few seconds), the process searches the 3D geometric model for at least one planar structure (e.g., dominant planar structure) associated with one or more potential objects of interest within the environment. These potential objects of interest may include an object that was captured based on the user aiming the camera toward the object and also other objects located within the environment. In this manner, the process searches a broader number of potential objects of interest for planar structures than may have been intended or completely seen by the user. A partially finished reconstruction can be sufficient for searching and then a later search can search other parts of the environment that have been finished later. The computing device may have a confidence metric for each planar structure. At block 210, the process creates (e.g., automatically creates) at least one rectified image having at least one potential object of interest in a frontal or orthogonal view for a visual search. Creating the rectified output image may include unwarping the input image(s) of the planar structure from the pictures taken before by the SLAM system in order to create a rectified view of the planar structure. The user may have intended to capture some of the rectified output images while other rectified output images may not have been intended to be captured. The user may not know that any or some of the rectified output images will be used for a visual search or the computing device may not receive a user input for the visual search.

After the rectified image has been created, the system can either present it to the user for confirmation or automatically upload it to a visual search server immediately at block 212. With the bandwidth typically available to mobile phones today, uploading an image and receiving the search result usually takes only a few seconds. Hence, the automatic method will usually be preferable. Using a rectified image can potentially speed up the descriptor extraction and matching required on the server side as discussed in conjunction with FIG. 5 and FIG. 6.

Figure 3:
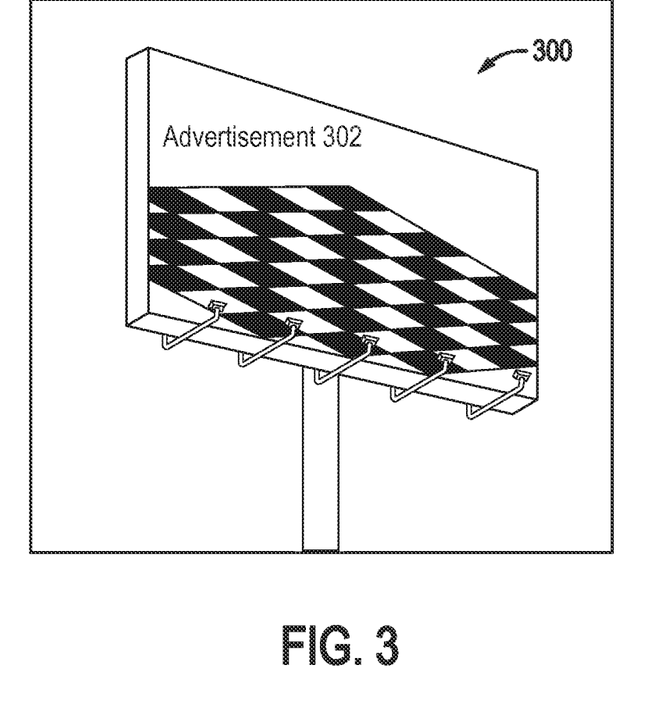
FIG. 3 is an image of a billboard advertisement as captured by a computing device.
Figure 4:
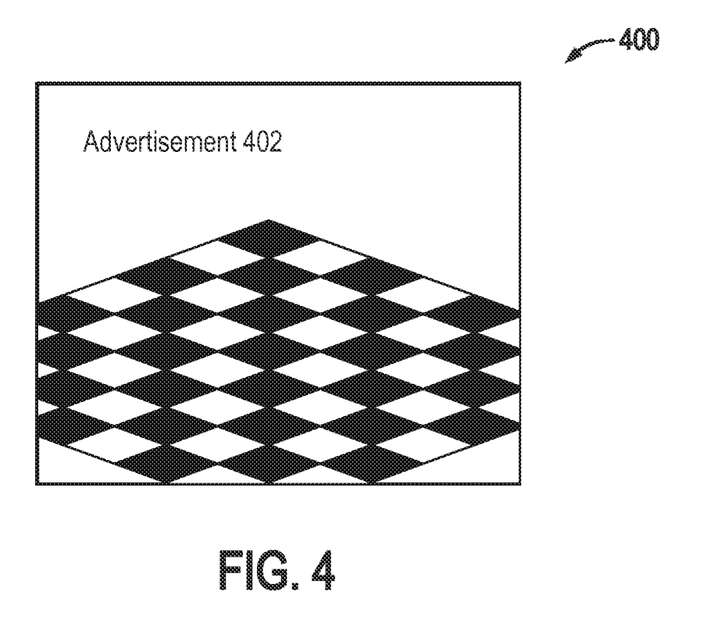
FIG. 4 is a frontal view of the image of the billboard advertisement after the image is rectified.

FIG. 3 and FIG. 4 illustrate rectifying an input image 300 to create an output image 400. FIG. 3 is an image 300 of a billboard advertisement 302 as captured by a computing device. The computing device is not orthogonal or normal with respect to the billboard advertisement 302 during the capture of the image 300. Rather, the computing device is tilted upwards at an angle in order to capture the image 300. FIG. 4 is a frontal view of the image 400 of the billboard advertisement 402 after the computing device has rectified the image 300. For this task, it is irrelevant whether a plane of the billboard advertisement is fully visible in a single image or if it spans multiple images. The computing device can send the image 400 to a server for a visual search.

In an embodiment, a user builds a 3D geometric model of an entire room. For example, the room may include many small planar objects (e.g., pictures, posters, product boxes, magazines, etc.). The computing device that builds the 3D geometric model also locates planar structures of the small planar objects, rectifies these planar structures, and sends them to a server for a visual search without the user having to identify and select the objects.

In another embodiment, a user is not able to take a single picture that covers a large enough portion of the object of interest. This occurs when the camera does not have a wide field of view (as is the case with mobile phone cameras) and there is not enough space to move far enough away from the object so that it is fully visible in the camera image. For example, the computing device can reconstruct an environment that includes a narrow corridor with a large painting such that the camera of the computing device (e.g., mobile phone) cannot capture the whole painting in a single camera shot (without having too steep of an angle). The computing device detects the large plane covering the whole painting, rectifies the painting from many captured input images into one rectified output image, and sends it to the server for the visual search.

In one embodiment, automatically creating at least one rectified image having at least one potential object of interest for the visual search includes unwarping one planar structure into a frontal view for each output image. In another embodiment, automatically creating at least one rectified image having at least one potential object of interest includes rectifying portions of the at least one potential object of interest from multiple input images to create the at least one output image.

Figure 5:
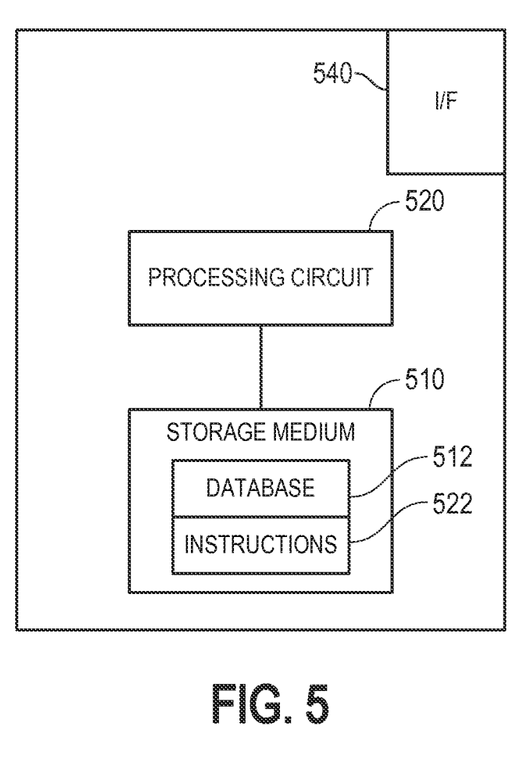
FIG. 5 illustrates a server for performing a visual search.

FIG. 5 illustrates a server 500 for performing a visual search. The server 500 includes storage medium 510 having a database 512 to store images and a processing circuit 520 that is configured to execute instructions 522 to receive at least one rectified image via a network interface 540. The network interface may be coupled with a wired or wireless link to a local or wide area network. The at least one rectified image includes at least one potential object of interest as captured by a computing device for a visual search. The processing circuit 520 is configured to execute instructions to extract descriptors representing features (e.g., high contrast regions) of the at least one rectified image. A sequence of numbers (e.g., 128 numbers) may represent a feature. The extracted descriptors of the at least one rectified image are designed to be invariant to rotation, scale, and lighting without needing to be invariant to perspective or affine distortion. The processing circuit 520 is further configured to execute instructions 522 to match the extracted descriptors of the at least one rectified image with descriptors of any of the images stored in the database. The processing circuit 520 is further configured to execute instructions 522 to transmit information associated with at least one image stored in the database that has descriptors matching the extracted descriptors. In one embodiment, the extracted descriptors of the at least one rectified image are not invariant to perspective or affine distortion. An exemplary storage medium (e.g., a computer-readable medium having software code or instructions) is coupled to the processing circuit such that the processing circuit can read information from, and write information to, the storage medium. In the alternative, the storage medium may be integral to the processing circuit.

Figure 6:
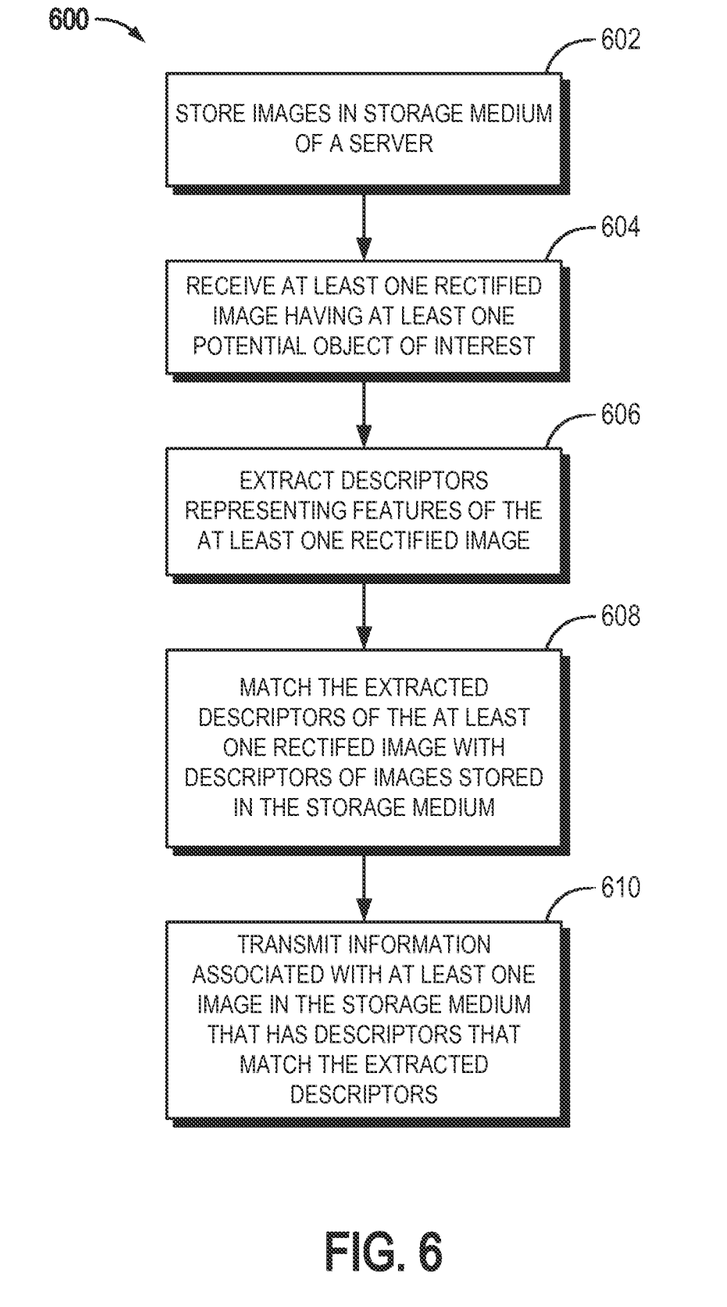
FIG. 6 is a flow diagram to illustrate a process implemented at a server for performing a visual search.

With additional reference to FIG. 6, a flow diagram is shown to illustrate a process 600 implemented at a server for visual searching. The process 600 includes storing a plurality of images in a storage medium of the server at block 602. The storage medium may include a database for storing the images. The process 600 includes receiving at least one rectified image having at least one potential object of interest from a computing device for a visual search at block 604. The process extracts descriptors representing features of the at least one rectified image at block 606. The extracted descriptors of the at least one rectified image are designed to be invariant to rotation, scale, and lighting without needing to be invariant to perspective or affine distortion. The process matches the extracted descriptors of the at least one rectified image with descriptors of images stored in the database at block 608. The process transmits information associated with at least one image stored in the database that has descriptors that match or substantially match the extracted descriptors at block 610.

Descriptors, which represent features on an image, are usually designed to be invariant to rotation, scale, lighting and a certain degree of perspective distortion. This invariance is at the cost of losing discriminative power, as by definition, changes in these variables should have little impact on the computed descriptor. Using a rectified image potentially allows the use of less invariant but more discriminative descriptors, which could also be faster and cheaper to extract and to match. Descriptors would still need to be rotation, scale and lighting invariant, but the most difficult invariance to deal with—perspective distortion—would no longer be a requirement. A more discriminative descriptor would allow a larger number of objects to be detected, by allowing the disambiguation of descriptors which might otherwise be similar using, for example, a scale-invariant feature transform (SIFT). In one embodiment, the extracted descriptors of the at least one rectified image are not invariant to perspective distortion or affine distortion.

It should be appreciated that when the computing device or server is a mobile or wireless device that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM.®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method implemented at a computing device, comprising:
    receiving one or more images from an image capture device, the one or more images including an environment and at least a portion of one or more potential objects of interest within the environment;
    storing the one or more images with the computing device;
    building at least a partial three dimensional (3D) geometric model of the environment included in the one or more images, the at least partial 3D geometric model including at least the portion of the one or more potential objects of interest within the environment, wherein the at least partial 3D geometric model is built using at least one image of the one or more images; and
    automatically creating, using the at least partial 3D geometric model, at least one rectified image having at least one potential object of interest for a visual search, the at least one rectified image including a modified perspective view of the at least one potential object of interest relative to a view of the at least one potential object of interest in the one or more images.

2. The method of claim 1, further comprising:
automatically uploading the at least one rectified image to a server for the visual search.

3. The method of claim 1, further comprising:
uploading the at least one rectified image to a server for the visual search.

4. The method of claim 1, wherein the one or more images are captured with an image capture device that is associated with the computing device, wherein automatically creating at least one rectified image having at least one potential object of interest for the visual search occurs without receiving a user input.

5. The method of claim 1, wherein the one or more images are automatically captured with an image capture device that is associated with the computing device during a background operation without receiving a user input.

6. The method of claim 1, wherein the one or more images are captured with an image capture device that is associated with the computing device during a time period with the image capture device moving for at least a portion of the time period.

7. The method of claim 1, wherein the one or more images are captured with an image capture device that is associated with the computing device, wherein the image capture device is capable of providing depth information for the at least one potential object of interest and to capture the one or more images while the image capture device is not required to move.

8. The method of claim 1, further comprising:
searching the at least partial 3D geometric model of the environment for at least one planar structure associated with at least the portion of the one or more potential objects of interest within the environment.

9. The method of claim 1, wherein the at least partial 3D geometric model of the environment is built using a structure-from-motion system.

10. The method of claim 1, further comprising:
searching the at least partial 3D geometric model of the environment for at least two planar structures associated with at least the portion of the one or more potential objects of interest within the environment.

11. The method of claim 1, wherein automatically creating at least one rectified image having at least one potential object of interest for the visual search comprises unwarping one planar structure into a frontal view for each rectified image.

12. The method of claim 1, wherein automatically creating at least one rectified image having at least one potential object of interest comprises rectifying portions of the at least one potential object of interest from multiple input images to create the at least one rectified image.

13. A computing device comprising:
a storage medium to store one or more received images, the one or more received images including an environment and at least a portion of one or more potential objects of interest within the environment; and
a processing circuit coupled to the storage medium, the processing circuit is configured to execute instructions to build at least a partial three dimensional (3D) geometric model of the environment included in the one or more images, the at least partial 3D geometric model including at least the portion of the one or more potential objects of interest within the environment, wherein the at least partial 3D geometric model is built using at least one image of the one or more stored images and to automatically create, using the at least partial 3D geometric model, at least one rectified image having at least one potential object of interest for a visual search, the at least one rectified image including a modified perspective view of the at least one potential object of interest relative to a view of the at least one potential object of interest in the one or more images.

14. The computing device of claim 13, wherein the processing circuit is further configured to execute instructions to automatically upload the at least one rectified image to a server for the visual search.

15. The computing device of claim 13, wherein the processing circuit is further configured to execute instructions to upload the at least one rectified image to a server for the visual search.

16. The computing device of claim 13, further comprising:
an image capture device coupled to the storage medium, the image capture device to capture the one or more images, wherein the storage medium to receive the one or more images from the image capture device.

17. The computing device of claim 16, wherein the processing circuit is configured to execute instructions to automatically create at least one rectified image having at least one potential object of interest for the visual search without receiving a user input.

18. The computing device of claim 16, wherein the images are automatically captured with the image capture device during a background operation without receiving a user input.

19. The computing device of claim 16, wherein the one or more images are captured with the image capture device during a time period in which the image capture device is moving for at least a portion of the time period.

20. The computing device of claim 16, wherein the image capture device is capable of providing depth information for the at least one potential object of interest and to capture the one or more images while the image capture device is not required to move.

21. The computing device of claim 13, wherein the processing circuit is further configured to execute instructions to search the at least partial 3D geometric model of the environment for at least one planar structure associated with at least the portion of the one or more potential objects of interest within the environment.

22. The computing device of claim 13, wherein the at least partial 3D geometric model of the environment is built using a structure-from-motion system.

23. The computing device of claim 13, wherein the processing circuit is further configured to execute instructions to search the at least partial 3D geometric model of the environment for at least two planar structures associated with at least the portion of the one or more potential objects of interest within the environment.

24. The computing device of claim 13, wherein automatically creating at least one rectified image having at least one potential object of interest for the visual search comprises unwarping one planar structure into a frontal view for each rectified image.

25. The computing device of claim 13, wherein automatically creating at least one rectified image having at least one potential object of interest comprises rectifying portions of the at least one potential object of interest from multiple input images to create the at least one rectified image.

26. A computer program product executed at a computing device comprising:
a non-transitory computer-readable medium comprising code for:
storing one or more images with the computing device, the one or more images including an environment and at least a portion of one or more potential objects of interest within the environment;

building at least a partial three dimensional (3D) geometric model with the computing device of the environment included in the one or more images, the at least partial 3D geometric model including at least the portion of the one or more potential objects of interest within the environment, wherein the at least partial 3D geometric model is built using at least one image of the one or more images; and automatically creating, using the at least partial 3D geometric model, at least one rectified image having at least one potential object of interest for a visual search, the at least one rectified image including a modified perspective view of the at least one potential object of interest relative to a view of the at least one potential object of interest in the one or more images.

27. The computer program product of claim 26, further comprising code for automatically uploading the at least one rectified image to a server for the visual search.

28. The computer program product of claim 26, further comprising code for uploading the at least one rectified image to a server for the visual search.

29. The computer program product of claim 26, wherein the one or more images are captured by an image capture device that is associated with the computing device, wherein automatically creating at least one rectified image having at least one potential object of interest for the visual search occurs without receiving a user input.

30. The computer program product of claim 26, wherein the one or more images are captured by an image capture device that is associated with the computing device during a background operation without receiving a user input.

31. The computer program product of claim 26, wherein the one or more images are captured by an image capture device that is associated with the computing device during a time period with the image capture device moving for at least a portion of the time period.

32. The computer program product of claim 26, wherein the one or more images are captured by an image capture device that is associated with the computing device, wherein the image capture device is capable of providing depth information for the at least one potential object of interest and to capture the one or more images while the image capture device is not required to move.

33. The computer program product of claim 26, further comprising code for searching the at least partial 3D geometric model of the environment for at least one planar structure associated with at least the portion of the one or more potential objects of interest within the environment.

34. The computer program product of claim 26, wherein the at least partial 3D geometric model of the environment is built using a structure-from-motion system.

35. The computer program product of claim 26, further comprising code for searching the at least partial 3D geometric model of the environment for at least two planar structures associated with at least the portion of the one or more potential objects of interest within the environment.

36. The computer program product of claim 26, wherein automatically creating at least one rectified image having at least one potential object of interest for the visual search comprises unwarping one planar structure into a frontal view for each rectified image.

37. The computer program product of claim 26, wherein automatically creating at least one rectified image having at least one potential object of interest comprises rectifying portions of the at least one potential object of interest from multiple input images to create the at least one rectified image.

38. An apparatus comprising:

means for storing one or more received images, the one or more received images including an environment and at least a portion of one or more potential objects of interest within the environment;

means for building at least a partial three dimensional (3D) geometric model of the environment included in the one or more images, the at least partial 3D geometric model including at least the portion of the one or more potential objects of interest within the environment, wherein the at least partial 3D geometric model is built using at least one image of the one or more stored images; and means for automatically creating, using the at least partial 3D geometric model, at least one rectified image having at least one potential object of interest for a visual search, the at least one rectified image including a modified perspective view of the at least one potential object of interest relative to an initial view of the at least one potential object of interest.

39. The apparatus of claim 38, further comprising:
means for automatically uploading the at least one rectified image to a server for the visual search.

40. The apparatus of claim 38, further comprising:
means for uploading the at least one rectified image to a server for the visual search.

41. The apparatus of claim 38, further comprising:
means for capturing the one or more images, wherein the means for storing to receive the one or more images from the means for capturing.

42. The apparatus of claim 41, wherein the means for automatically creating at least one rectified image having at least one potential object of interest for the visual search occurs without receiving a user input.

43. The apparatus of claim 41, wherein the one or more images are captured automatically during a background operation without receiving a user input.

44. The apparatus of claim 41, wherein the one or more images are captured during a time period in which the means for capturing the one or more images is moving for at least a portion of the time period.

45. The apparatus of claim 41, wherein the means for capturing is capable of providing depth information for the at least one potential object of interest and to capture the one or more images while the means for capturing is not required to move.

46. The apparatus of claim 38, further comprising:
means for searching the at least partial 3D geometric model of the environment for at least one planar structure associated with at least the portion of the one or more potential objects of interest within the environment.

47. The apparatus of claim 38, further comprising:
means for searching the at least partial 3D geometric model of the environment for at least two planar structures associated with at least the portion of the one or more potential objects of interest within the environment.

48. The apparatus of claim 38, wherein the means for automatically creating at least one rectified image having at least one potential object of interest for the visual search comprises unwarping one planar structure into a frontal view for each rectified image.

49. The apparatus of claim 38, wherein the means for automatically creating at least one rectified image having at least one potential object of interest comprises rectifying portions of the at least one potential object of interest from multiple input images to create the at least one rectified image.

50. The apparatus of claim 38, wherein the at least partial 3D geometric model of the environment is built using a structure-from-motion system.

\* \* \* \* \*